R. J. TORRANCE.
PACKING RING FOR PISTONS.
APPLICATION FILED NOV. 20, 1915.

1,294,199

Patented Feb. 11, 1919.

WITNESS

C. W. Ellis

INVENTOR

R. J. Torrance

BY

John M. Spellman
ATTORNEY

UNITED STATES PATENT OFFICE.

ROBERT J. TORRANCE, OF DALLAS, TEXAS.

PACKING-RING FOR PISTONS.

1,294,199.

Specification of Letters Patent. Patented Feb. 11, 1919.

Application filed November 20, 1915. Serial No. 62,451.

*To all whom it may concern:*

Be it known that I, ROBERT J. TORRANCE, a citizen of the United States, residing at Dallas, in the county of Dallas and State of Texas, have invented certain new and useful Improvements in Packing-Rings for Pistons, of which the following is a specification.

My invention has relation to a packing ring for pistons, particularly of the type known as split rings, and in such connection it relates more particularly to the means whereby when the ring is assembled on the piston and in the cylinder the split portion of the ring is transversely closed to prevent leakage therethrough of gases or vapors.

In packing pistons for gas, gasolene or vapor engines, split rings have been used which are permitted to expand slightly under wear and tear. The difficulty heretofore encountered with rings of this character is that it is almost impossible to prevent leakage through the split in the ring, particularly as the ring expands.

It is the main object of my invention to connect the split ends of the ring with a stud-like connection which may expand with the ring and yet no matter what position the ends of the ring assume either through wear or otherwise, the space between the contiguous split ends of said ring is sealed to prevent passage of gas therethrough.

To carry out my invention the split ring has concentric inner and outer peripheries and is relatively wide. In the outer periphery at each split end is cut an elongated groove, the base of which lies along a chord of the circle of the ring and in the inner periphery below this elongated groove is cut a recess to fit, when the split ends abut, the base of the connecting stud. Each split end is annularly recessed to receive and permit of play of the shank of said stud.

The nature and scope of my invention will be more fully understood from the following description taken in connection with the accompanying drawings, forming part hereof, in which, Figure 1 is a plan view of a packing ring embodying the main features of my invention;

Figure 3:
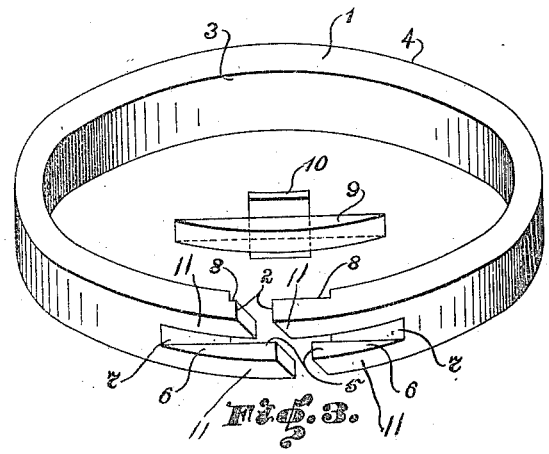
Fig. 3 is a perspective view of the ring and connecting stud separated from each other.

Referring to the drawings, 1 is the packing ring cut diagonally as at 2 to form a split ring. The ring when split is elastic and springs open as shown in Fig. 3. When assembled on the piston and within the cylinder, the ends of the ring abut under spring tension and the ring to all intents and purposes is solid. The inner periphery 3 and outer periphery 4 of the ring are concentric. In each of the diagonally cut ends 2 of the ring is cut a notch 5 and in the outer periphery of the ring, at the split, is cut a groove 6, the base 7 of which lies along a chord of the circle of the ring. The inner periphery at the split ends is cut out to form a transverse recess 8.

Figure 1:
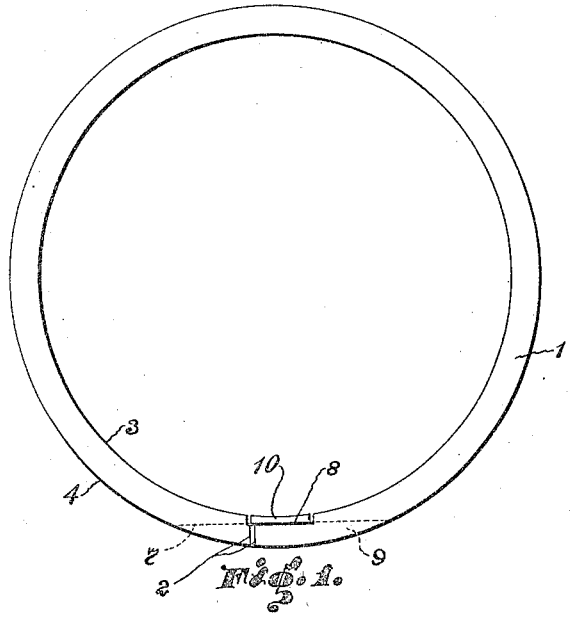
Figure 2:
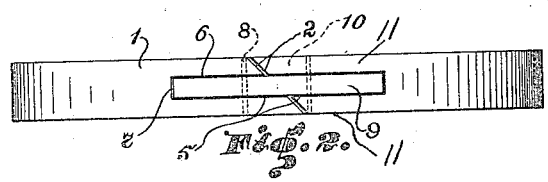
Fig. 2 is an end elevational view thereof.

To connect the ends there is provided a stud, the head 9 of which is formed to completely fill the groove 6 when the ends of the ring are forced together (see Fig. 2) and the base 10 of said stud fills the recess 8 when the ring is closed. Said base is coextensive in width with the ring and the base and head of the stud are joined by a shank which fits in the notches 5.

When assembled the head 9 of the stud is inclosed between two relatively wide ungrooved portions 11 of the ring and in a groove 6 in such a manner as to completely span the split or diagonal opening in the ring and the base 10 likewise closes the base of said opening.

The stud may play in the recessed, grooved and notched ends of the ring as the ring expands and contracts and in any of the varying positions or in case of wear on the ring to the limit of its expansion the head 9 forms a complete closure for the opening between the ends of the ring. This arrangement of stud between two walls 11 of substantial width permits of the formation of a ring which is not substantially weakened at any point.

Having thus described the nature and objects of my invention, what I claim as new and desire to secure by Letters Patent is,—

1. In a device of the character described, the combination of a divided ring having a groove on its convex face substantially midway between the sides of the ring and extending through the ends thereof, the ends of said ring being under-cut to provide shoulders and an insert comprising outwardly projecting arms to engage and fill said groove and an integral base projecting laterally beyond the sides of said arms and coextensive in width with the width of the ring, said base being adapted to be disposed transversely of said ring, beneath said under-cut ends, with the shoulders thereon in cooperative relation with the shoulders on said under-cut ends.

2. In a device of the character described, a continuous split ring having a groove on its convex face substantially midway between the sides of the ring, and said ring having its concave surface cut out to form a recess, in combination with a keeper for the ends of the ring, said keeper having a base extending the entire width of the ring and fitting in the recess in the concave surface of said ring and a head traversing the ends of the ring and fitting in the groove of the convex face of said ring, said head and base being so constructed as to remain permanently in the groove and recess of the ring after the ring has worn beyond its normal expansion.

In testimony whereof I have signed my name to this specification.

ROBERT J. TORRANCE.